Jan. 16, 1923.

J. C. KREHBIEL.
FORK AND SHOVEL ATTACHMENT.
FILED MAY 10, 1921.

J. C. Krehbiel
INVENTOR

BY Victor J. Evans
ATTORNEY

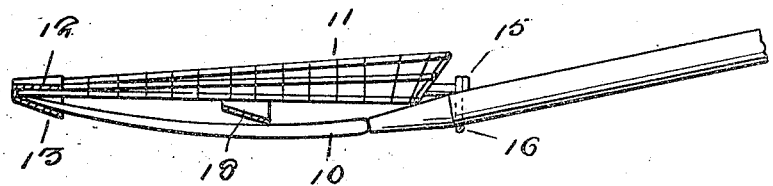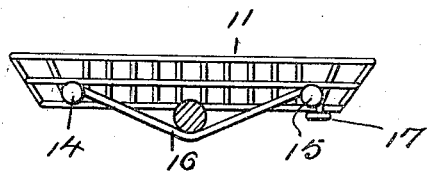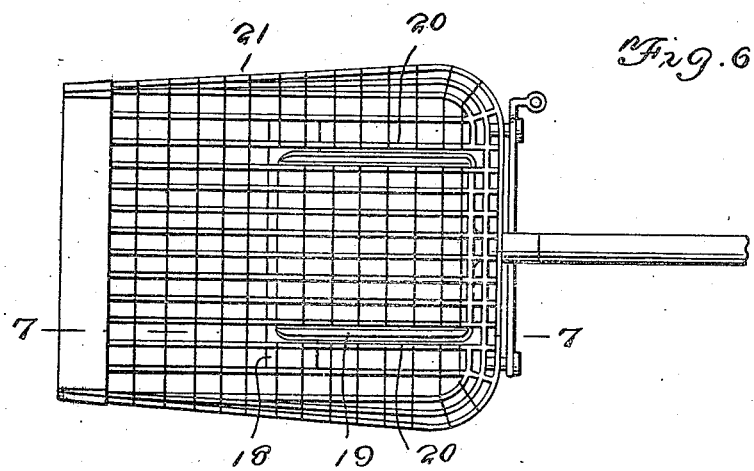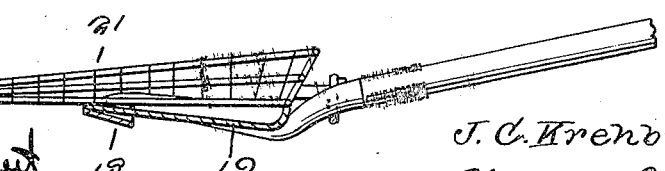

Jan. 16, 1923.
J. C. KREHBIEL.
FORK AND SHOVEL ATTACHMENT.
FILED MAY 10, 1921.
1,442,671.
3 SHEETS—SHEET 3.
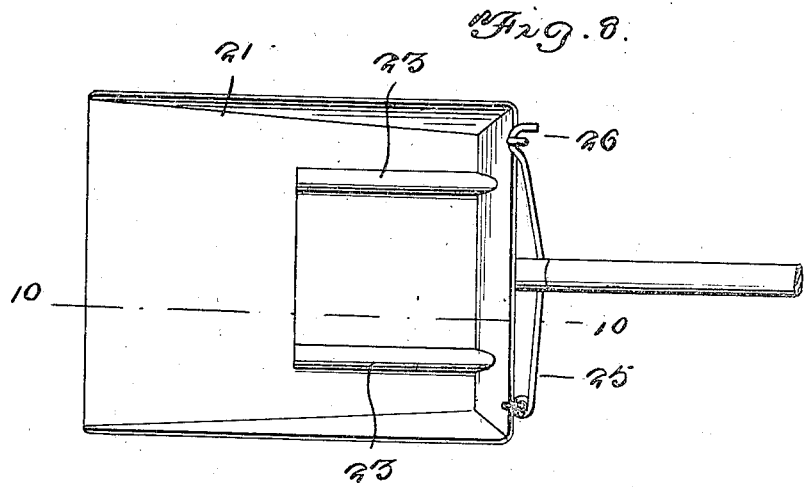
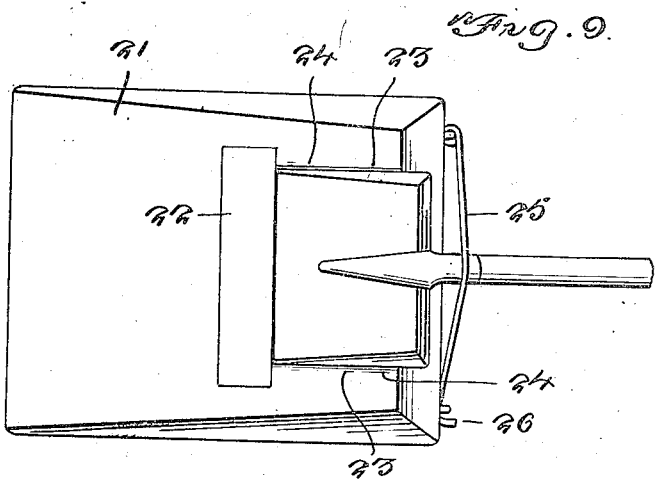
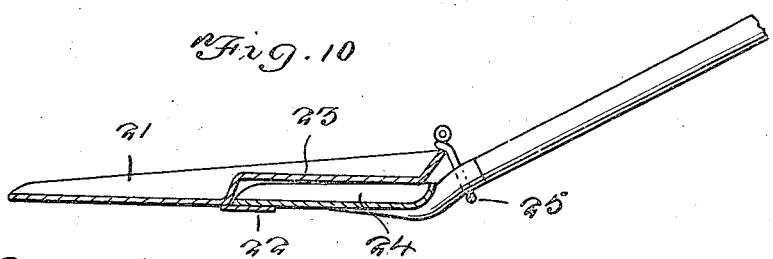

Patented Jan. 16, 1923.

1,442,671

UNITED STATES PATENT OFFICE.

JACOB C. KREHBIEL, OF MOUNDRIDGE, KANSAS.

FORK AND SHOVEL ATTACHMENT.

Application filed May 10, 1921. Serial No. 468,448.

*To all whom it may concern:*

Be it known that I, JACOB C. KREHBIEL, a citizen of the United States, residing at Moundridge, in the county of McPherson and State of Kansas, have invented new and useful Improvements in Fork and Shovel Attachments, of which the following is a specification.

This invention comprehends the provision of an attachment for a fork or small bladed shovel, whereby either may be readily converted into a screened bottom scoop, while the invention is further susceptible of converting a small bladed shovel into a shovel of larger capacity to conveniently handle grain or the like.

The nature and advantages of the invention will be better understood when the following detailed description is read in connection with the accompanying drawings, the invention residing in the combination, construction, and arrangement of parts as claimed.

In the drawings forming part of this application, like numerals of reference indicate similar parts in the several views and wherein:

Figure 4 is a sectional view taken on line 4—4 of Figure 2.

Figure 5 is a view similar to Figure 1 showing a small bladed shovel instead of the fork.

Figure 6 is a plan view showing the association of the attachment with a small bladed shovel.

Figure 7 is a sectional view taken on line 7—7 of Figure 6.

Figure 8 is a view showing the shovel associated with a modified form of the invention, whereby the small bladed shovel may be converted into a shovel of larger capacity.

Figure 9 is a bottom plan view thereof.

Figure 10 is a sectional view taken on line 10—10 of Figure 8.

Figure 1:
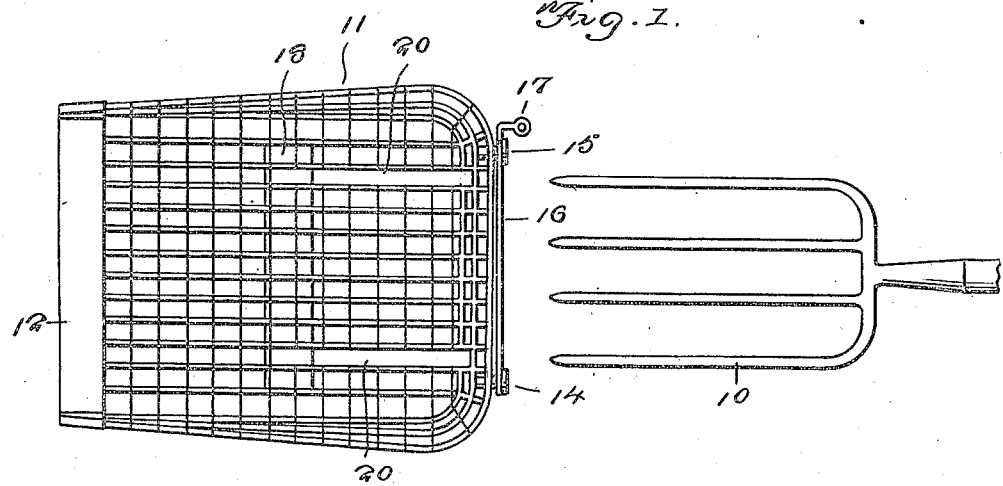
Figure 1 is a plan view of a fork and the attachment therefor separated.
Figure 2:
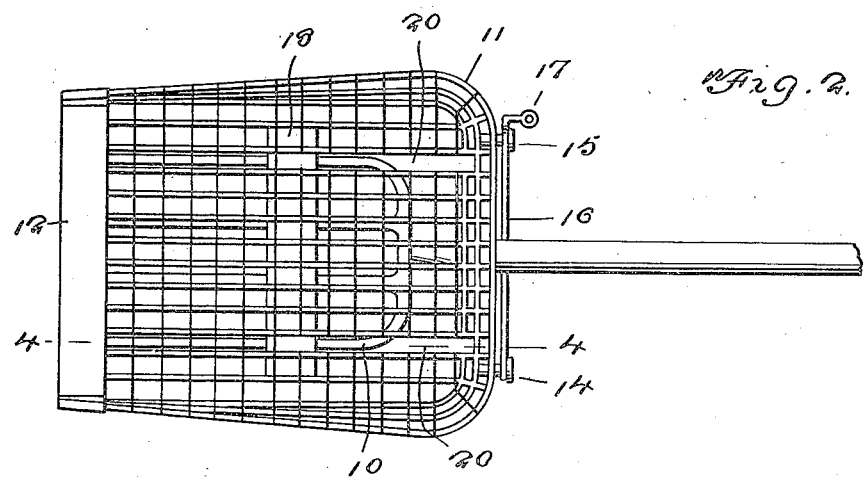
Figure 2 is a similar view showing the attachment associated with the fork.
Figure 3:
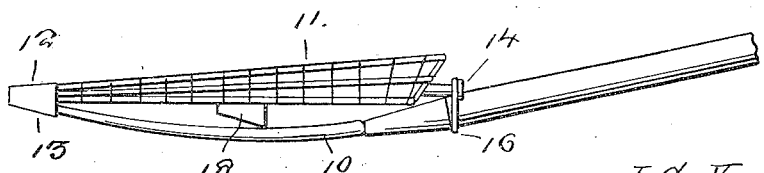
Figure 3 is a side elevation of Figure 2.

Referring to the drawings in detail, and particularly Figures 1 to 4 inclusive, I have illustrated the invention used in connection with a pitch fork, whereby the latter may be converted into a screened bottom scoop for conveniently handling corn cobs, potatoes or the like. The fork is indicated at 10, while the attachment therefor is in the form of a scoop 11 and constructed of a wire mesh to provide a foraminated bottom. The working or forward edge of the scoop is embraced by a metallic member of substantially V-shaped formation in cross section, the member being indicated at 12 and having its branch 13 arranged under the scoop slightly spaced therefrom to accommodate the prongs of the fork 10 when the attachment is associated with the latter as illustrated in Figure 2. Projecting from the opposite end of the scoop 11 are spaced pins 14 and 15 respectively, while pivoted upon the pin 14 is a resilient clamping bar 16 which is adapted to be arranged across the handle of the fork as shown, the free end of the bar having an offset extremity 17 adapted to engage the pin 15, thereby holding the scoop fixed upon the fork. When the attachment is in position for use, the fork is converted into a foraminated scoop of a size to permit of the convenient handling of corn cobs, potatoes or the like. Secured to the underside of the scoop 11 and arranged transversely thereof is a metallic strip 18 which has one edge slightly spaced from the bottom to accommodate the working extremity of a small bladed shovel in a manner to be presently described. In addition to this function, the strip 18 serves to reinforce the scoop 11, and contacts the prongs of the fork at a point in their length, so that the weight of the contents of the scoop 11 is effectively sustained at three points over the area of the scoop.

The scoop 11 is formed to provide spaced parallel slots 20 which permits of the use of the scoop in connection with a small bladed shovel 19 as well as with a pitch fork in a manner above described. In Figures 5 and 6 I have illustrated the manner of using the scoop with the shovel 19, the forward edge of the blade of the shovel being positioned between the bottom of the scoop and the metallic strip 18, while the side flanges of the shovel are received by the spaced parallel slots 20. The scoop is clamped to the shovel in the same manner as described in connection with the handle of the pitch fork.

In order that the invention may be used with a small bladed shovel, for the purpose of conveniently handling grain or the like, I provide a scoop 21 which is constructed from suitable non-perforated material. The bottom of this scoop is provided with a transversely disposed strip 22 which is the equivalent of the strip 18 above referred to and used for the same purpose, namely, to confine the forward edge of the blade 19 between the bottom of the scoop 21 and said strip 22. This scoop 21 is also formed to provide spaced parallel slots 23 to accommodate the side flanges 24 of the shovel 19, thereby allowing the attachment to be nicely associated with the shovel for the purpose mentioned. The scoop 21 is also provided with a resilient clamping bar 25 provided upon the scoop at one end, while the opposite end of the bar is offset to engage a keeper 26, thereby holding the scoop 21 fixed relatively to the shovel when associated therewith. The invention is very simple in construction, susceptible of being quickly and easily attached to or removed from the implements mentioned, and can be manufactured and sold at a nominal cost.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A fork or shovel attachment comprising a scoop constructed of foraminated material, a metallic member embracing the forward end of the scoop and having a portion spaced from the bottom of the scoop, a transversely disposed member secured to the bottom of the scoop and having one edge spaced therefrom, said scoop having spaced parallel slots arranged at a right-angle to the transverse member, and a resilient bar carried by the end of the scoop for detachably clamping the scoop to the handle of the implement with which it is used.

2. A fork attachment comprising a scoop constructed of foraminated material, an angle-shaped member embracing the forward edge of the scoop and having a portion spaced from the underside of the bottom of the latter, a pair of opposing pins carried by the opposite end of the scoop a resilient clamping bar detachably secured to the pins and adapted to engage the handle of the fork for the purpose specified.

3. A fork or shovel attachment of the character described comprising a scoop, a metallic member arranged transversely of the scoop at one end thereof and having one edge spaced therefrom, a pair of spaced parallel pins secured to the opposite end of said scoop, a resilient bar pivotally secured to one pin, said bar adapted to swing on its pivot to engage the handle of the implement and detachably connected to the opposing pin for the purpose specified.

In testimony whereof I affix my signature.

JACOB C. KREHBIEL.